United States Patent
Smith

(10) Patent No.: US 8,414,010 B2
(45) Date of Patent: Apr. 9, 2013

(54) SYSTEM AND METHOD FOR DRAWBAR SUPPORT

(75) Inventor: Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 326 days.

(21) Appl. No.: 12/950,020

(22) Filed: Nov. 19, 2010

(65) Prior Publication Data

US 2012/0125647 A1 May 24, 2012

(51) Int. Cl.
*B62D 13/00* (2006.01)

(52) U.S. Cl.
USPC ................................ 280/463; 280/468; 172/2

(58) Field of Classification Search ................ 172/1–11, 172/26.5, 63, 72, 197, 199, 342, 786, 787, 172/799.5, 684.5, 445.1, 445.2, 146, 157, 172/193, 439, 272; 37/268, 269; 280/463, 280/468, 483, 446.1, 439, 474, 462, 455.1; 97/46.27
See application file for complete search history.

(56) References Cited

U.S. PATENT DOCUMENTS

| | | | |
|---|---|---|---|
| 3,394,474 A | 7/1968 | Rockwell | |
| 4,044,843 A | 8/1977 | Holub | |
| 4,053,018 A | 10/1977 | Takeda | |
| 4,535,847 A | 8/1985 | Hasegawa et al. | |
| 4,898,247 A | 2/1990 | Springfield | |
| 5,348,101 A | 9/1994 | Fox et al. | |
| 5,884,204 A | 3/1999 | Orbach et al. | |
| 6,068,064 A | 5/2000 | Bettin et al. | |
| 6,141,612 A | 10/2000 | Flamme et al. | |
| 6,382,326 B1 | 5/2002 | Goins et al. | |
| 6,443,475 B1* | 9/2002 | Fegley | 280/468 |
| 6,698,524 B2* | 3/2004 | Bernhardt et al. | 172/7 |
| 6,698,784 B2* | 3/2004 | Workman | 280/479.1 |
| 6,745,849 B2 | 6/2004 | Guiet | |
| 7,401,657 B2 | 7/2008 | Huber | |
| 7,513,521 B2 | 4/2009 | Posselius et al. | |
| 7,600,576 B2 | 10/2009 | Gayer | |
| 2006/0237203 A1 | 10/2006 | Miskin | |
| 2008/0230244 A1 | 9/2008 | Moyna | |

* cited by examiner

*Primary Examiner* — Robert Pezzuto
(74) *Attorney, Agent, or Firm* — Patrick M. Sheldrake

(57) ABSTRACT

A system and method to selectably control a position of a first end of a drawbar between a locked position and a suspended position with respect to a drawbar support. The drawbar is securable to a work vehicle distal from the first end, the method includes locking a position of the first end in response to a first predetermined condition and placing the first end in a suspended position in response to a second predetermined condition. Position control of the first end is continuously maintainable.

18 Claims, 9 Drawing Sheets

SYSTEM AND METHOD FOR DRAWBAR SUPPORT

FIELD OF THE INVENTION

The present invention is directed to a system and method for work vehicles having a drawbar, and, more particularly, to a system and method for selectably supporting the drawbar.

BACKGROUND OF THE INVENTION

Many work vehicles, such as a tractor, utilize a drawbar to pull an implement behind the vehicle. Implements, such as an earth scraper, may exert widely varying amounts of force on the drawbar during operation. Conventional drawbars are rigidly mounted to the vehicle and susceptible to shock loading in response to the varying forces generated by the earth scraper.

Accordingly, there is a need for a drawbar arrangement and support system for use with self-propelled vehicles that at least partially dissipates shock loading associated with use of implements.

SUMMARY OF THE INVENTION

The present invention relates to a fluid circuit to selectably control a position of a first end of a drawbar between a locked position and a suspended position with respect to a drawbar support, the drawbar securable to a work vehicle distal from the first end. The fluid circuit includes a first control valve including at least a raising position, a neutral position and a lowering position, with one of the positions of the first control valve being selectably in fluid communication with a first port and a second port. The first port of the first control valve is connectable to a source of pressurized fluid flow, and the second port of the first control valve connectable to a first accumulator. A fluid cylinder is in fluid communication with the second port of the first control valve to operate the fluid cylinder between a retracted position and an extended position. The fluid cylinder is operatively connected to selectably control the position of the first end of the drawbar by operation of the fluid cylinder. A second control valve in fluid communication with the fluid cylinder includes at least an open position and a locked position, with one of the positions of the second control valve being selectably in fluid communication with a third port and a fourth port. The third port of the second control valve is connectable to the fluid cylinder, and the fourth port of the second control valve connectable to a second accumulator. To selectably move the first end of the drawbar toward the locked position, the first control valve is selectably actuated to the lowering position and the second control valve is selectably actuated to the open position, until a support structure operatively connected to the fluid cylinder urges the first end of the drawbar into abutting contact with the drawbar support. To maintain the first end of the drawbar in the locked position, the first control valve is selectably actuated to the neutral position and the second control valve is selectably actuated to the locked position. To selectably move the end of the drawbar from the locked position to the suspended position, the first control valve is selectably actuated from the neutral position to the raising position and the second control valve is selectably actuated from the locked position to the open position.

The present invention further relates to a work vehicle including a structure operatively connected to a fluid system to selectably control a position of a first end of a drawbar between a locked position and a suspended position with respect to a drawbar support. The drawbar is secured to the vehicle distal from the first end, the fluid circuit including a first control valve including at least a raising position, a neutral position and a lowering position, with one of the positions of the first control valve being selectably in fluid communication with a first port and a second port. The first port of the first control valve is connectable to a source of pressurized fluid flow, the second port of the first control valve is connectable to a first accumulator. A fluid cylinder is in fluid communication with the second port of the first control valve to operate the fluid cylinder between a retracted position and an extended position. The fluid cylinder is operatively connected to selectably control the position of the first end of the drawbar by operation of the fluid cylinder. A second control valve in fluid communication with the fluid cylinder includes at least an open position and a locked position, with one of the positions of the second control valve being selectably in fluid communication with a third port and a fourth port. The third port of the second control valve is connectable to the fluid cylinder, and the fourth port of the second control valve is connectable to a second accumulator. To selectably move the first end of the drawbar toward the locked position, the first control valve is selectably actuated to the lowering position and the second control valve is selectably actuated to the open position, until a support structure operatively connected to the fluid cylinder urges the first end of the drawbar into abutting contact with the drawbar support. To maintain the first end of the drawbar in the locked position, the first control valve is selectably actuated to the neutral position and the second control valve is selectably actuated to the locked position. To selectably move the end of the drawbar from the locked position to the suspended position, the first control valve is selectably actuated from the neutral position to the raising position and the second control valve is selectably actuated from the locked position to the open position.

The present invention yet further relates to a method to selectably control a position of a first end of a drawbar between a locked position and a suspended position with respect to a drawbar support. The drawbar is securable to a work vehicle distal from the first end, the method includes locking a position of the first end in response to a first predetermined condition, and placing the first end in a suspended position in response to a second predetermined condition. Position control of the first end is continuously maintainable.

An advantage of the present invention is a flexible drawbar to dissipate shock loading associated with towing an implement.

A further advantage of the present invention is a fluid system usable to selectably position an end of a drawbar associated with towing an implement between a locked position and a suspended position.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
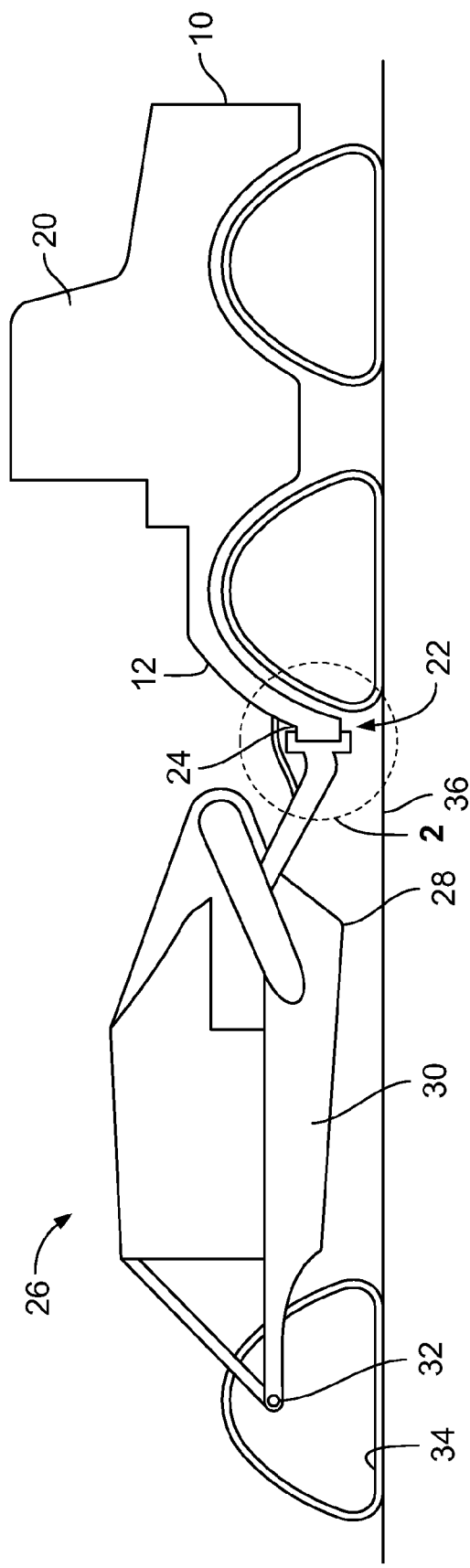
FIG. 1 is a side view of an embodiment of a work vehicle towing an implement of the present invention.

FIG. 1 shows a work vehicle 20 (e.g., a tractor) having a drawbar assembly 22 secured to a lower rear end thereof. Drawbar assembly 22 includes an elongate drawbar 24 that is operably connected to an implement 26, such as a scraper as shown in FIG. 1, to be towed by work vehicle 20, having a forward portion 10 and rearward portion 12, in the well-known manner. As further shown in FIG. 1, implement or scraper 26 is connected to work vehicle 20 by drawbar 24. It should be noted that scraper 26 can exert significant, widely-varying loading conditions in both forward and in rearward directions with respect to the work vehicle, as well as side-to-side and vertical directions with respect to the work vehicle, as the work vehicle tows the scraper during the course of the scraping operation, which includes a scrape mode and a transport mode. Scraper 26 includes a blade 28, receiving area or bin 30, rotatable axle 32 and wheel or track apparatus 34. A tongue or hitch 11 is operably connected to work vehicle 20. Typically, a connection of scraper 26 to a pressurized fluid source, such as a hydraulic pump (not shown), provides power from work vehicle 20 to the scraper to allow lowering and raising of scraper blade 28. During the loading mode, blade 28 is lowered to a selected depth and scraper 26 is towed in a direction following the work vehicle such that the blade scrapes ground surface 36, thereby removing earth from the ground surface. Earth removed by the scraper blade is directed into the receiving area or bin 30, typically until the receiving area or bin is filled. Thereafter, during the transport mode, blade 28 is raised and scraper 26 is towed to a dump site before the earth is released from bin 30. The rate of travel or speed at which work vehicle 20 tows scraper 26 during the loading mode is typically less than the rate of travel or speed at which the work vehicle tows the scraper during the transport mode, primarily due to the significant reduction in operating loads associated with the transport mode as compared to the scrape mode. That is, the loading speed is typically less than the transport speed. In one exemplary embodiment, the loading speed can be approximately four (4) mph, whereas the transport speed can be approximately eight (8) mph.

When drawbar 24 is raised or lowered, the position of scraper blade 28 (FIG. 1) relative to the ground can be affected. Although blade 28 can usually be adjusted directly by way of a fluid circuit included in scraper 26, itself, it is advantageous to isolate scraper blade 28 from being affected by drawbar 24. This isolation allows for more precise control over scraper dig depth. An example of a dig depth is four (4) inches.

Figure 2:
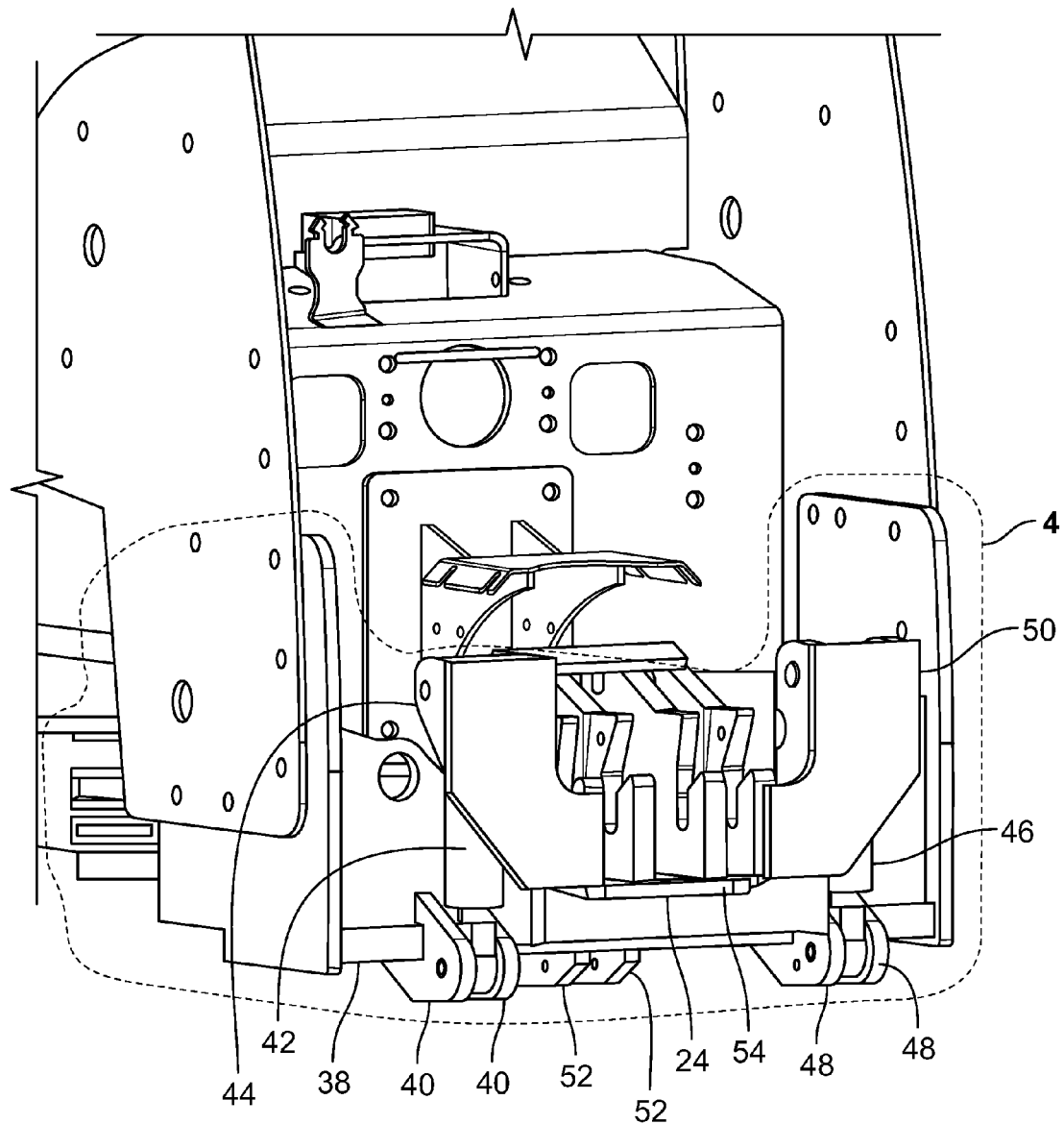
FIG. 2 is an enlarged, partial, forward looking perspective view of the lower rear end of the work vehicle, including a drawbar assembly taken from region 2 of FIG. 1.

FIG. 2 shows an enlarged, partial, forward looking perspective view of the lower rear end of work vehicle 20 taken from a region 2 of FIG. 1. As further shown in FIG. 2, drawbar assembly 22 further includes a drawbar support 38, such as a bar, extending substantially transverse to drawbar 24, which drawbar extends substantially aft, rearward or otherwise in a direction generally away from forward portion 10 of the work vehicle (FIG. 1), the drawbar terminating at a first end 54. As shown, drawbar assembly 22 also includes a pair of drawbar hangers or tabs 40 that each extend beneath and around one portion of drawbar support 38. A fluid cylinder 42 is operatively connected at one end to drawbar hangers or tabs 40 and also operatively connected at the other end of the fluid cylinder to a support structure 44 in order to permit movement of drawbar 24 with respect to drawbar support 38, as well as to provide structural support for the drawbar. Fluid cylinder 42 utilizes a fluid from a pressurized fluid source (not shown), such as a pneumatic or hydraulic source, providing pressurized fluid to a fluid circuit as will be further discussed below. As further shown in FIG. 2, a fluid cylinder 46 is operatively connected at one end to drawbar hangers or tabs 48 and also operatively connected at the other end of the fluid cylinder to a support structure 50 in order to permit movement of drawbar 24 with respect to drawbar support 38, as well as to provide structural support for the drawbar. In one embodiment, additional drawbar hangers or tabs 52 (structural support device for drawbar tabs 52 not shown) can be positioned between drawbar tabs 40 and drawbar tabs 48 to provide additional support for drawbar support 38. In an alternate embodiment, a single fluid cylinder and a corresponding drawbar tab may be employed. In a further embodiment, more than two fluid cylinders and corresponding drawbar tabs may be used to provide drawbar support.

Figure 3:
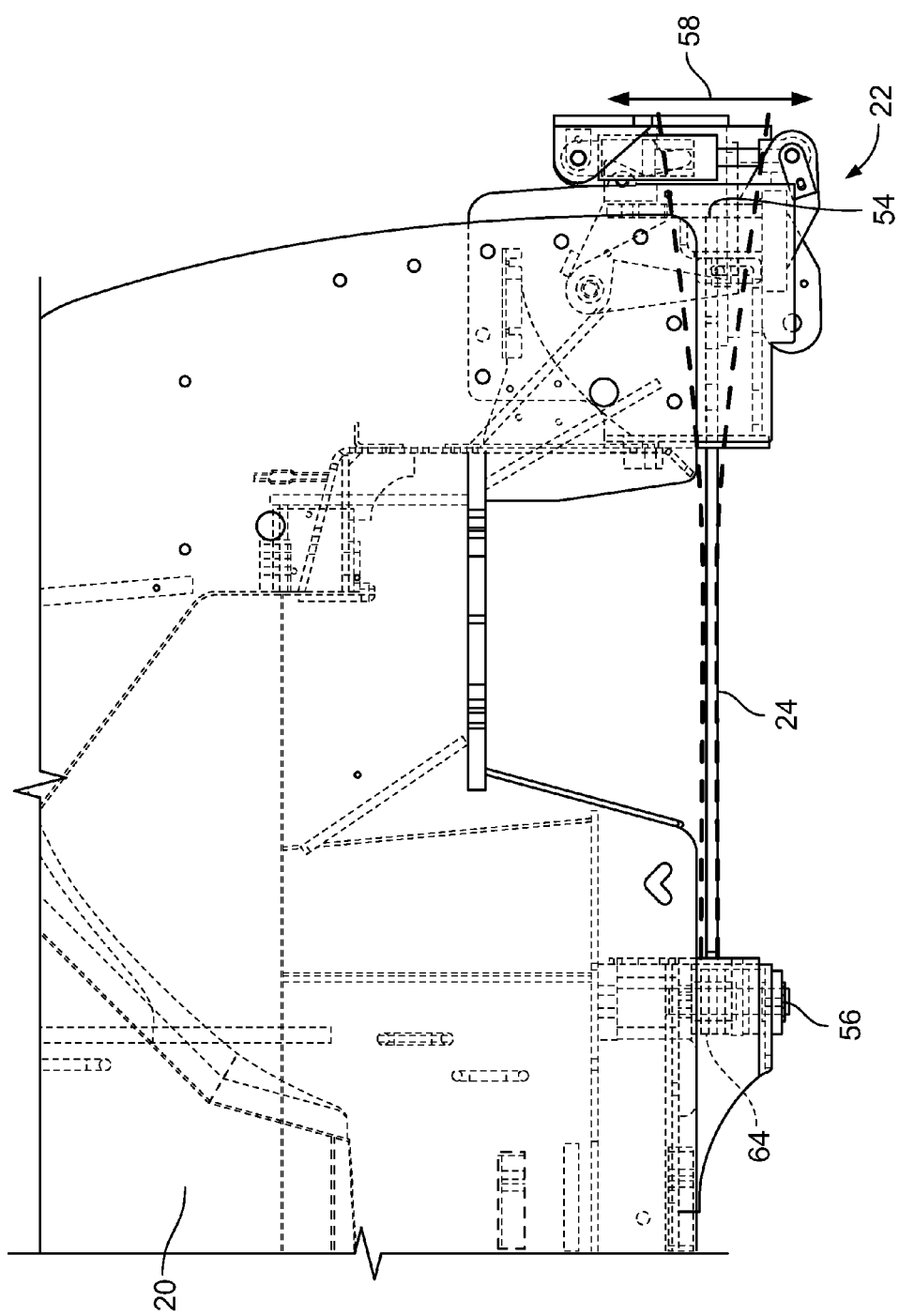
FIG. 3 is a side view of FIG. 2.

As shown in FIG. 3, drawbar 24 is secured to work vehicle 20 such as by a pivotable connection 56. Drawbar 24 is composed of a suitable structurally robust, yet flexible material, such as an appropriate grade of carbon steel, permitting deflection of a first end 54 (FIG. 5) of the drawbar that is distal to pivotable connection 56 such as near a second end 64 of the drawbar. First end 54 may move in response to a pivoting movement about the axis of pivotable connection 56. In addition, first end 54 can move in other directions, such as in response to sufficient forces applied along substantially vertically directed arrow heads 58, which will likewise urge the first end to move along directed arrow heads 58. By utilizing drawbar support 38, the ratio of width to height (thickness) of drawbar 24 may be increased, increasing flexibility of the drawbar, while still permitting the drawbar to support maximum loading conditions, such as encountered during scrape mode. The ratio of width to height (thickness) of the drawbar is typically measured transverse to the direction of travel of the work vehicle. In one embodiment, plates (not shown), may be utilized near first end 54 (FIG. 5) of drawbar 24 to provide enhanced structural stiffness/strength as required by the application. In a further embodiment, when first end 54 of drawbar 24 is not supported by drawbar support 38, the first end of the drawbar defines a cantilevered structural arrangement. By providing a drawbar arrangement having both an increased ratio of width to height (thickness) and an increased longitudinal length, non-axial forces applied to the first end 54 can be at least partially dampened by virtue of the elastic movement of the first end. Such elastic movement may act to reduce adverse effects of shock loads encountered by the drawbar and supporting structure. Similar benefits may also be achieved by use of fluid cylinder is to support the drawbar, as compared to a rigid drawbar secured by conventional mechanical fasteners.

Figure 4:
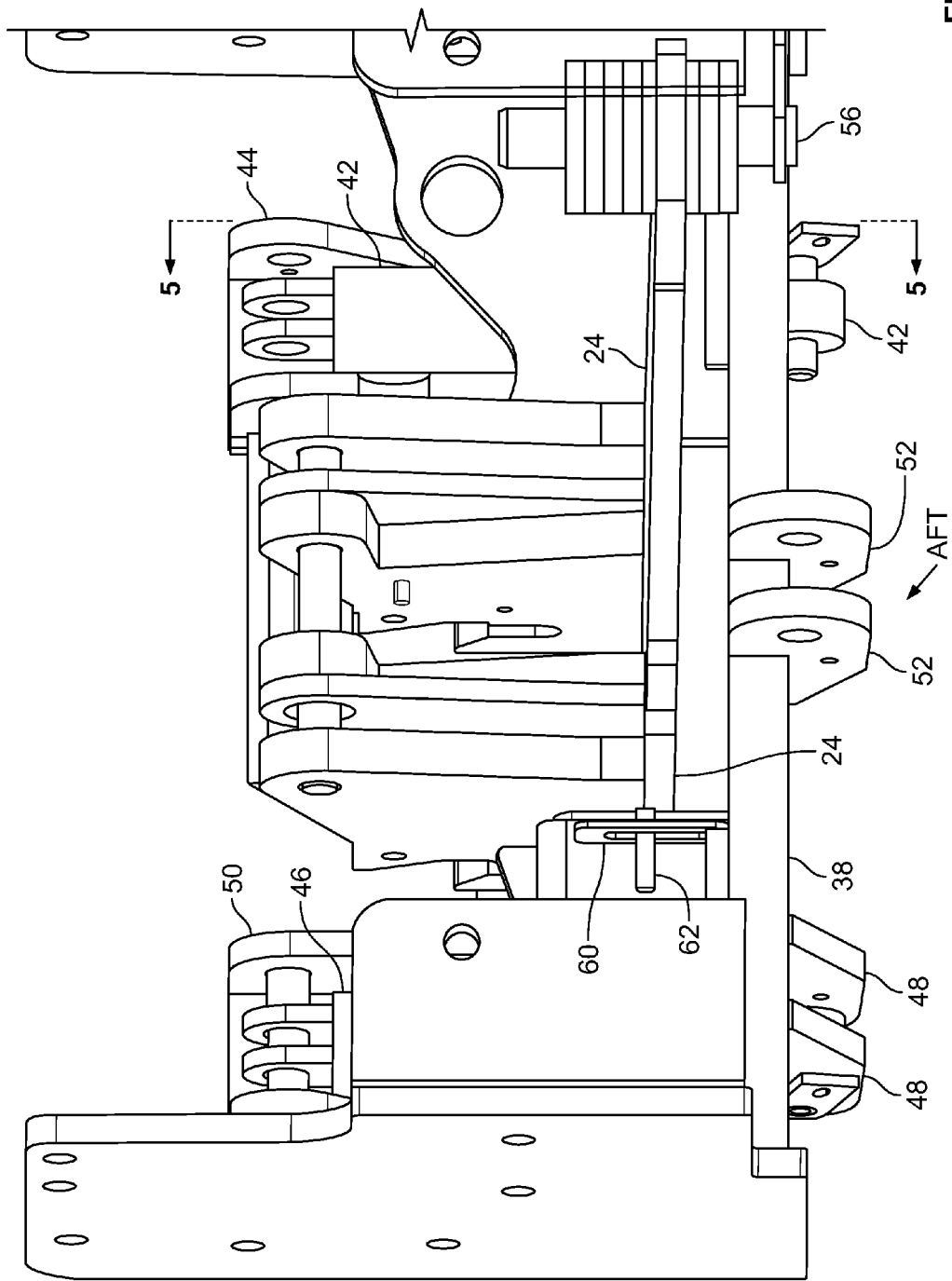
FIG. 4 is an enlarged, partial rearward looking perspective view of the work vehicle, including the drawbar assembly taken from region 4 of FIG. 2.
Figure 5:
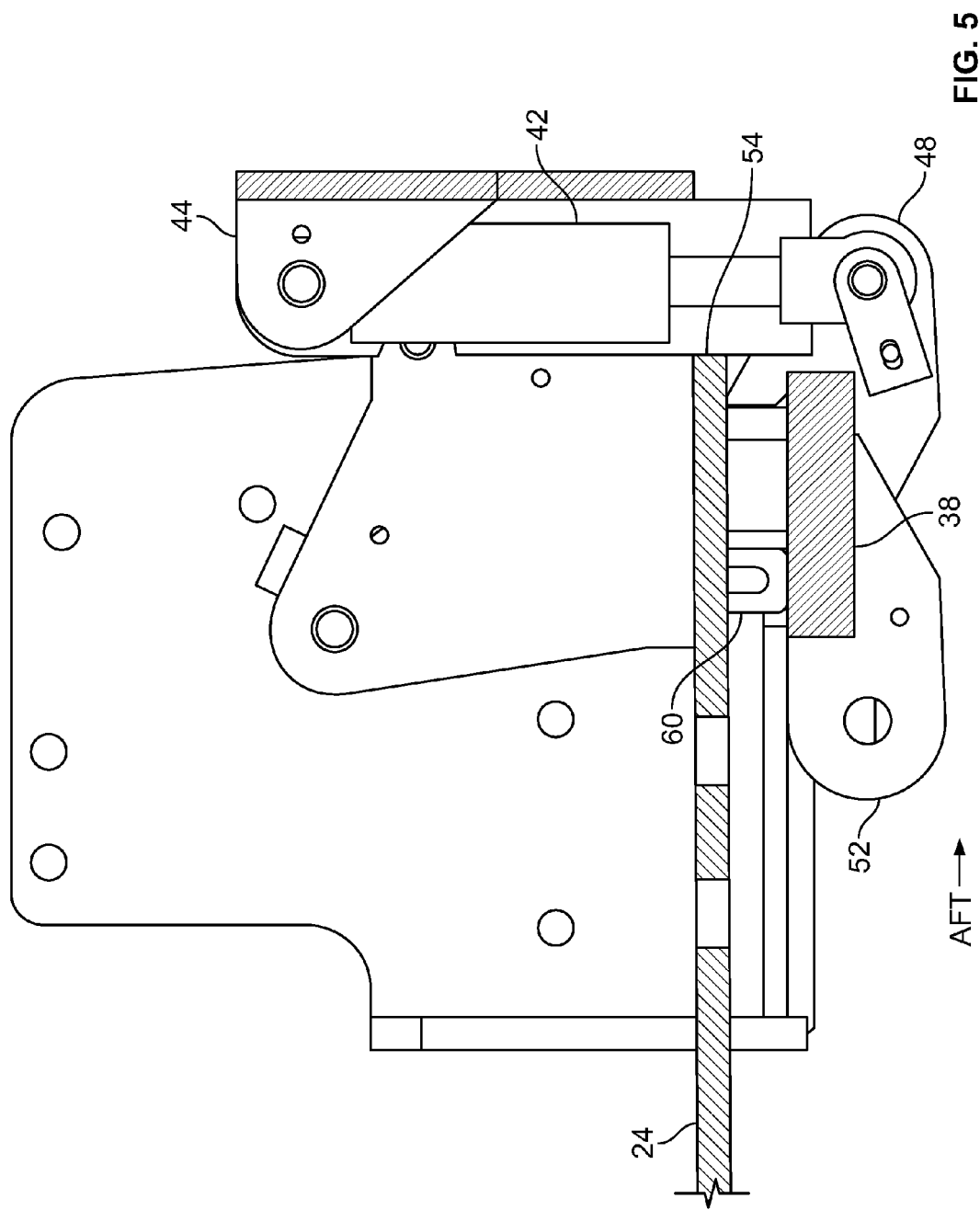
FIG. 5 is a side view of an embodiment of the drawbar assembly taken along line 5-5 from FIG. 4.

Referring to FIGS. 4-5, FIG. 4 shows an oblique, rearward or aft looking view of the lower rear end of work vehicle 20, substantially resembling FIG. 2 rotated approximately 180 degrees about a vertical axis. As further shown by FIGS. 4-5, a base 60 of a sensor 62 is secured to drawbar support 38 for sensing the position of drawbar 24 near the first end 54 of drawbar 24, such as the relative distance between first end 54 and drawbar support 38. The principle of operation of sensor 62 may be based upon magnetism, a potentiometer, optical or other suitable principal for operation to sense the position of the first end of the drawbar. It is to be understood that base 60 of sensor 62 may be mounted or associated with a structural member other than drawbar support 38, so that the sensor reading may be representative of a relative distance between the first end 54 and some other reference position, such as the ground, a different structural member of the work vehicle or other reference position.

Figure 6:
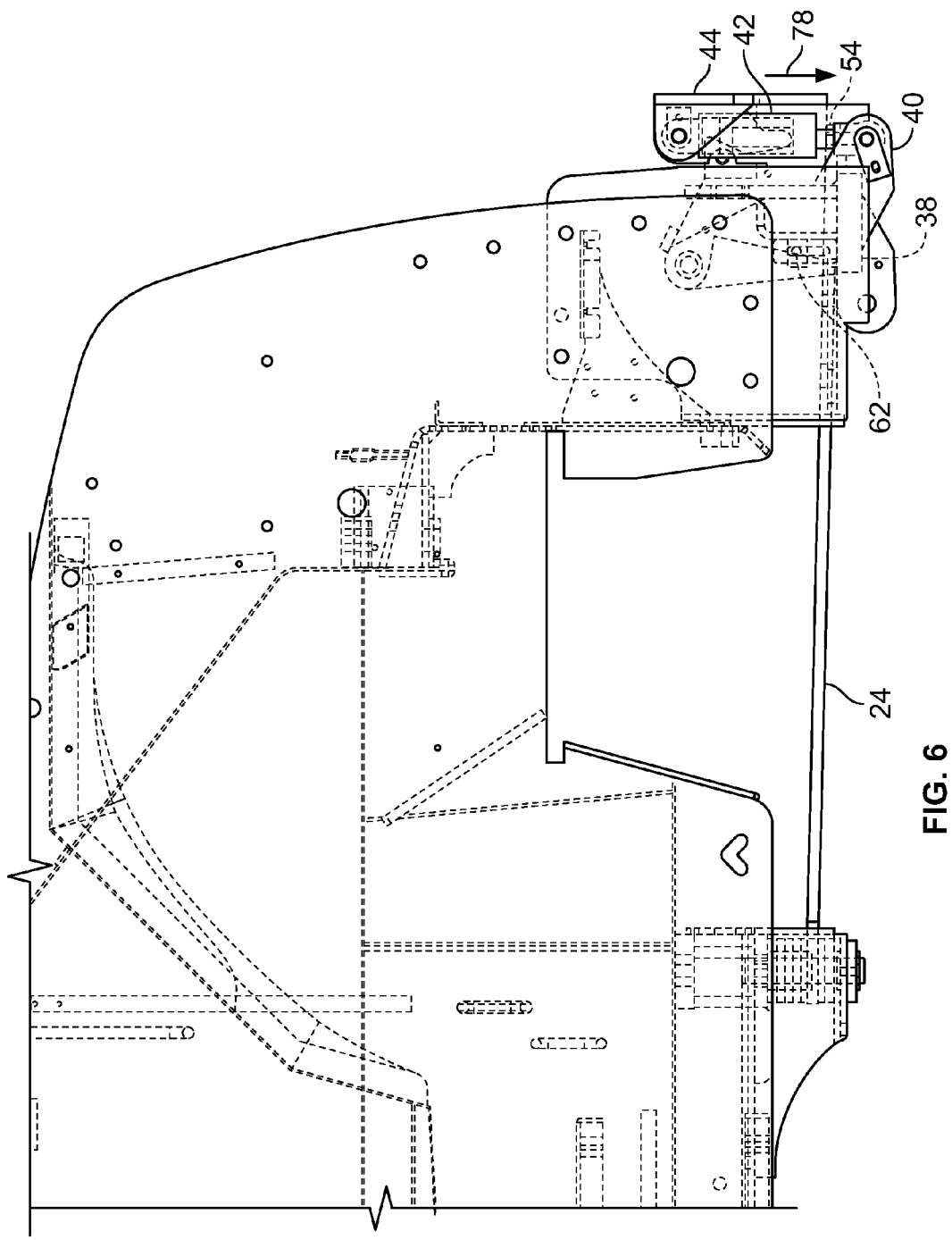
FIG. 6 is a side view showing the drawbar in a locked position.

FIG. 6 shows drawbar 24 in a supported position, such as in scrape mode. Only the left hand components of fluid cylinder 42, support structure 44 and drawbar tabs 40 are shown. It is to be understood that the corresponding right hand components of fluid cylinder 46, support structure 50 and drawbar tabs 48 (see FIG. 4) operate in a similar fashion as the right hand components. In the locked position, the ends of fluid cylinder 42 are brought toward each other, in which the end of the fluid cylinder that is distal from drawbar 24 and operatively connected to support structure 44 is urged to move along direction 78 toward the opposite end of the fluid cylinder, likewise resulting in movement of support structure 44 along direction 78 and into abutting contact with drawbar 24, likewise moving drawbar 24 in direction 78 until the facing surfaces of drawbar support 38 and drawbar 24 are brought into abutting contact. In this position, support structure 44 (and support structure 50 not shown) have downwardly deflected first end 54 of drawbar 24 for support by drawbar support 38.

Figure 7:
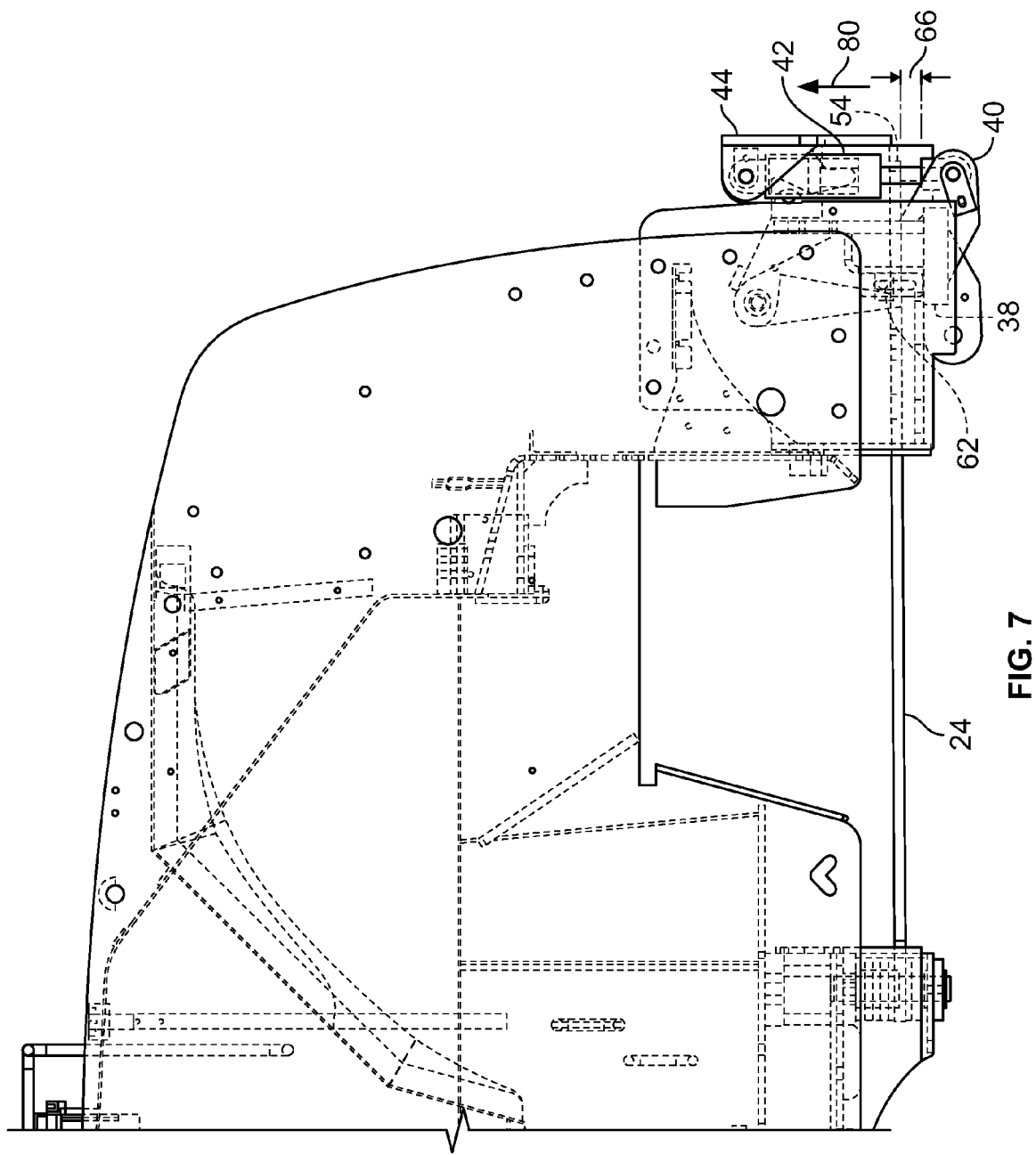
FIG. 7 is a side view showing the drawbar in a suspended position.

FIG. 7 shows drawbar 24 in an unsupported or suspended position, such as in transport mode. Only the left hand components of fluid cylinder 42, support structure 44 and drawbar tabs 40 are shown. It is to be understood that in the exemplary embodiment the corresponding right hand components of fluid cylinder 46, support structure 50 and drawbar tabs 48 (see FIG. 4) operate in a similar fashion as the right hand components. In the suspended position, the opposed ends of fluid cylinder 42 are urged away from each other, in which the end of the fluid cylinder that is distal from drawbar 24 and operatively connected to support structure 44 is urged to move along direction 80 away from the opposed end of the fluid cylinder, likewise resulting in mutual movement of support structure 44, as well as drawbar 24 along direction 80, resulting in a spacing 66 between the facing surfaces of drawbar support 38 and drawbar 24. The end 54 of drawbar 24 returns to a neutral or undeflected position, as permitted by sufficient movement in direction 80 by support structure 44. Since in transport mode the magnitude of the forces applied to the drawbar are reduced, structural support from drawbar support 38 typically is not required. Further, due to the increased ratio of width to height (thickness) of the drawbar, the first end 54 of the drawbar, which is in a cantilevered arrangement when unsupported near its first end, provides a resilient support of the tongue of the implement being pulled by the work vehicle, resulting in a smoother ride, so long as the first end of the drawbar does not deflect sufficiently to be brought into abutting contact with the drawbar support. An additional benefit is that by virtue of the reduction of forces applied by the fluid cylinder during transport mode, the operating life of the working vehicle, or at least components that would otherwise always be subjected to the forces in the scraping mode, may be extended.

It is to be understood that in one embodiment, the fluid cylinders 42, 46 and, the bus respective support structures 44, 50 may be moved independently of each other.

Figure 8:
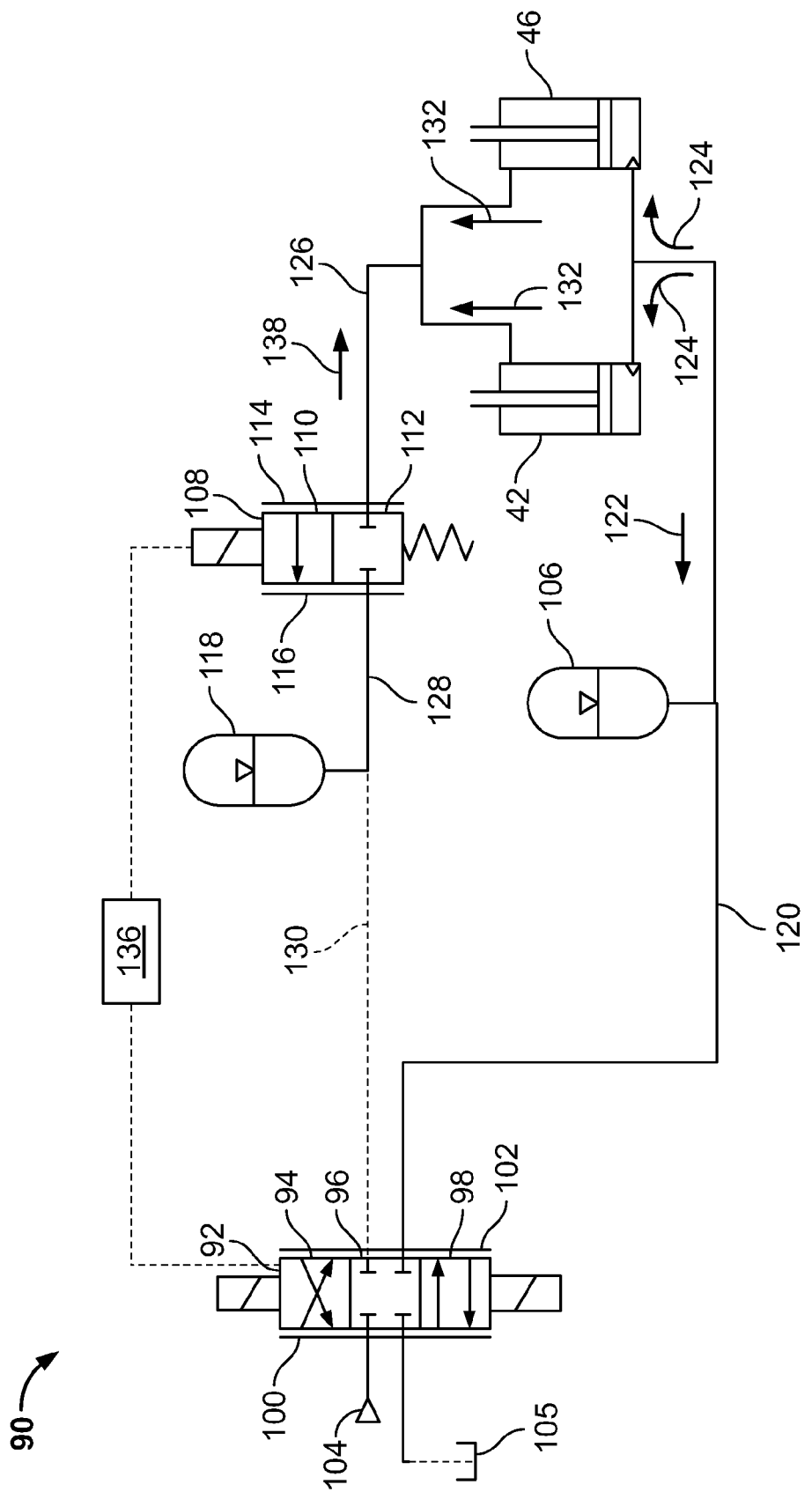
FIG. 8 is a schematic of a fluid circuit for selectably supporting the drawbar.

FIG. 8 is a schematic of a fluid circuit 90 usable to selectably control the position of a cantilevered end of a drawbar, or an end of a drawbar securable to a work vehicle that is distal from the cantilevered end, such as first end 54 of drawbar 24 as previously discussed. In other words, fluid circuit 90 can selectably lock the first end of the drawbar in a fixed position also referred to as a locked position, for use with an implement such as a scraper in scrape mode as previously discussed, or the fluid circuit can selectably suspend or remove vertical support from the first end of the drawbar by controlling the magnitude of a spacing 66 between the drawbar and the drawbar support, such as in transport mode of the scraper, as previously discussed. However, it is to be understood that other implements and other modes for use with those implements are contemplated by the present disclosure.

Fluid circuit 90 includes a first control valve 92, such as a solenoid valve having a raising position 94, a neutral position 96 and a lowering position 98, with one of the positions of the first control valve being selectably in fluid communication with a first port 100 and a second port 102. That is, first port 100 of first control valve 92 is connectable to a source 104 of pressurized fluid flow, such as hydraulic fluid or pneumatics, as well as a reservoir 105. Second port 102 of first control valve 92 is connectable to a first accumulator 106 via a line 120. A fluid cylinder, or multiple fluid cylinders such as fluid cylinders 42, 46 as identified in the exemplary embodiment, is in fluid communication with the second port 102 of first control valve 92 to operate the fluid cylinders 42, 46 between a retracted position and an extended position. In the retracted position (FIG. 6), end 54 of drawbar 24 is urged into movement by support structure 44, 50 operatively connected to respective fluid cylinders 42, 46 toward a position that locks the position of the drawbar 24 when the drawbar is brought into abutting contact with the drawbar support 38, such as when the work vehicle is towing the scraper implement behind the work vehicle, i.e., in scrape mode. In other words, fluid cylinders 42, 46 are operatively connected to selectably lock the vertical position of the first end 54 of the drawbar 24. The fluid cylinders 42, 46 lower the drawbar 24 with support structure 44, 50 operatively connected to and controlled by the fluid cylinders. That is, first control valve is actuated to lowering position 98 and second control valve is actuated to open position 110 so that pressurized fluid pressurized fluid from first accumulator 106 flows through line 120 in a direction 122 and from fluid cylinders 42, 46, urging the respective opposed ends of the fluid cylinders toward each other, likewise urging drawbar 24 toward drawbar support 38.

To achieve the suspended position (FIG. 7), the first end 54 of drawbar 24 is raised by the fluid cylinders 42, 46 until a spacing, such as spacing 66 is achieved between the facing surfaces of drawbar support 38 and drawbar 24, such as when the work vehicle is pulling the scraper implement behind the work vehicle, i.e., in transport mode. That is, in one embodiment, as further shown in FIG. 8 of fluid circuit 90, when drawbar 24 is being raised so that ends of the fluid cylinders are urged away from each other, first control valve 92 is actuated to a raising position 94 (and a second control valve 108 actuated to an open position 110), pressurized fluid flows from pressurized fluid source 104 to fluid cylinders 42, 46 through line 120 in a flow direction 124 (opposite flow direction 122) to urge the opposed ends of the fluid cylinder away from each other (and fluid flow away from the opposite end of fluid cylinders 42, 46 in direction 132 through lines 126, 128 to second accumulator 108), urging drawbar 24 away from drawbar support 38. In one embodiment, raising position 94 of first control valve 92 is configured to provide fluid flow from pressurized fluid source 104 through line 120 in fluid communication with the first accumulator 106 in a flow direction 124 at a rate such that a magnitude of pressurized fluid in the first accumulator is increased at substantially the same rate as the magnitude of pressurized fluid in the fluid cylinders 42, 46.

A controller 136 is used with sensor 62 for sensing a predetermined condition for selectably suspending or selectably locking the first end of the drawbar. The predetermined conditions include, but are not limited to an engine load of the work vehicle, a draft load on the drawbar, a setting of a control device configured to control the fluid circuit between a drawbar locked position and drawbar suspended position, a position as sensed by a position sensor of an implement connectable to the drawbar and operator control. In one embodiment, a third control valve (not shown) may be placed in fluid communication with the fluid circuit to permit selective operator control, that is, to selectably control the suspended position of the first end of the drawbar, or the magnitude of spacing 66 between the drawbar and the drawbar support. In other words, such additional control would provide operator with the capability to adapt to different loading conditions/applications or configure the "feel" of the work vehicle to provide handling characteristics of the work vehicle in a manner according to the preferences of the operator.

As further shown in FIG. 8, second control valve 108, which in one embodiment is a solenoid valve, is in fluid communication with the fluid cylinders 42, 46 and includes open position 110 and a locked position 112, with one of the positions of the second control valve being selectably in fluid communication with a third port 114 and a fourth port 116. Third port 114 of second control valve 108 is connectable to fluid cylinders 42, 46, while fourth port 116 of second control valve 108 is connectable to a second accumulator 118. In one embodiment, to place the first end 54 of drawbar 24 in a locked position from a suspended position, first control valve 92 is selectably actuated to lowering position 98 and second control valve 108 is selectably actuated to open position 110. Pressurized fluid from first accumulator 106 flows through line 120 in flow direction 122 and from respective fluid cylinders 42, 46 through first control valve 92 to reservoir 105. Simultaneously, fluid flows into the opposite end of fluid cylinders 42, 46 in fluid flow direction 138 through lines 126, 128 from second accumulator 118. These settings of fluid in circuit 90 result in the ends of the fluid cylinders moving toward each other, similarly bringing support structure 44, 50 into abutting contact with drawbar 24, and continuing to move the drawbar 24 until the facing surfaces of drawbar 24 is brought into abutting contact with drawbar support 38, also referred to as the locked position. To maintain drawbar 24 in the locked position, such as for use of a scraper implement in scraper mode, as previously discussed, first control valve 92 is selectably actuated to neutral position 96, and second control valve 108 is selectably actuated to locked position 112. In one embodiment, to selectably move the first end 54 of the drawbar 24 from the locked position to a suspended position, first control valve 92 is selectably actuated from neutral position 96 to raising position 94 and second control valve 108 is selectably actuated from locked position 112 to open position 110. In a further embodiment, an optional line 130 may be placed in fluid communication with line 128 and second accumulator 118 on one end and second port 102 of first control valve 92 at the other end. In a further embodiment, to selectably control the suspended position of the first end 54 of the drawbar 24, in response to a predetermined condition such as previously discussed, first control valve 92 is actuated from lowering position 98 to neutral position 96 in response to pressurized fluid on second port 102 of first control valve 92 reaching a predetermined pressure magnitude.

Figure 9:
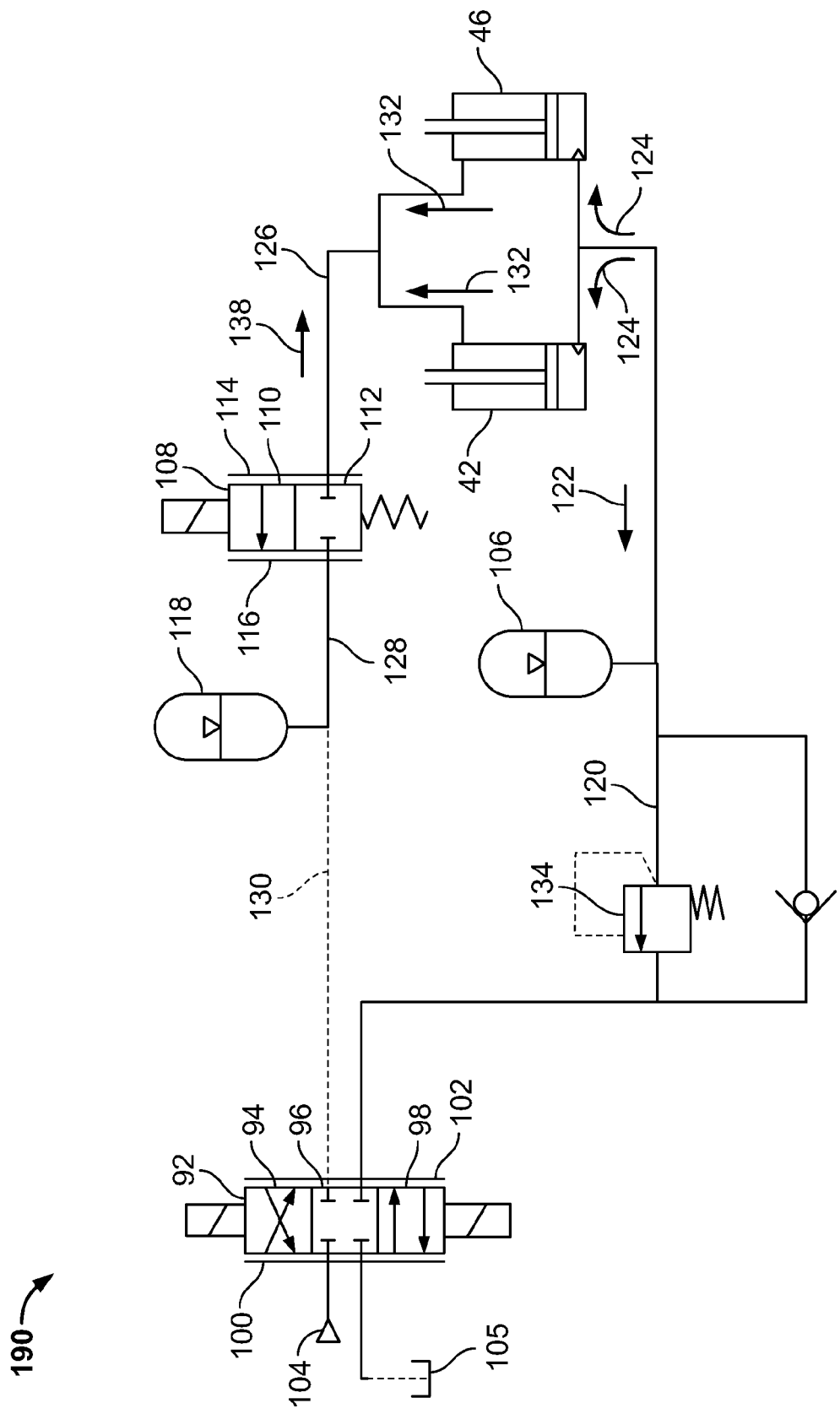
FIG. 9 is a schematic of an alternate embodiment of a fluid circuit for selectably supporting the drawbar.

Referring to FIG. 9, which is similar to FIG. 8, a relief valve 134 may be placed in fluid communication between second port 102 and first accumulator 106. Relief valve 134 helps equalize pressure in the portion of the fluid circuit 190 between first control valve 92 and fluid cylinders 42, 46 when it is desired to reduce the spacing between the first end 54 of the drawbar 24 and the drawbar support 38, i.e., selectably controlling the suspended position of the first end 54 of the drawbar 24 in order to prevent "droop" or an excessively lowered position of the first end 54 of the drawbar 24 with respect to the drawbar reacting to a vertical force encountered during operation of the implement. Such loading conditions could result in the end of the drawbar "bouncing" between support structure 44, 50 and drawbar support 38.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A fluid circuit to selectably control a position of a first end of a drawbar between a locked position and a suspended position with respect to a drawbar support, the drawbar securable to a work vehicle distal from the first end, the fluid circuit comprising:

a first control valve comprising at least a raising position, a neutral position and a lowering position, with one of the positions of the first control valve being selectably in fluid communication with a first port and a second port, the first port of the first control valve connectable to a source of pressurized fluid flow, the second port of the first control valve connectable to a first accumulator;

a fluid cylinder in fluid communication with the second port of the first control valve to operate the fluid cylinder between a retracted position and an extended position, the fluid cylinder operatively connected to selectably control the position of the first end of the drawbar by operation of the fluid cylinder; and a second control valve in fluid communication with the fluid cylinder comprising at least an open position and a locked position, with one of the positions of the second control valve being selectably in fluid communication with a third port and a fourth port, the third port of the second control valve connectable to the fluid cylinder, the fourth port of the second control valve connectable to a second accumulator;

wherein to selectably move the first end of the drawbar toward the locked position, the first control valve is selectably actuated to the lowering position and the second control valve is selectably actuated to the open position, until a support structure operatively connected to the fluid cylinder urges the first end of the drawbar into abutting contact with the drawbar support, and to maintain the first end of the drawbar in the locked position, the first control valve is selectably actuated to the neutral position and the second control valve is selectably actuated to the locked position;

wherein to selectably move the end of the drawbar from the locked position to the suspended position, the first control valve is selectably actuated from the neutral position to the raising position and the second control valve is selectably actuated from the locked position to the open position.

2. The fluid circuit of claim 1, wherein to selectably move the first end of the drawbar toward the locked position, the lowering position of the first control valve is configured to provide fluid flow from the fluid cylinder in fluid communication with the first accumulator to a reservoir at a rate such that a magnitude of pressurized fluid in the first accumulator is decreased at substantially the same rate as the magnitude of pressurized fluid in the fluid cylinder.

3. The fluid circuit of claim 1, wherein the first control valve and the second control valve are solenoid valves.

4. The fluid circuit of claim 1, comprising a sensor for sensing a predetermined condition for selectably controlling the position of the first end of the drawbar.

5. The fluid circuit of claim 4, wherein the predetermined condition is selected from the group consisting of an engine load of the vehicle, a draft load on the drawbar, a speed of the vehicle, a setting of a control device configured to control the fluid circuit between a locked position and a suspended position with respect to a drawbar support, a position as sensed by a position sensor of an implement connectable to the drawbar and operator control.

6. The fluid circuit of claim 5, wherein the implement is a scraper.

7. The fluid circuit of claim 1, comprising a relief valve in fluid communication with the first accumulator.

8. The fluid circuit of claim 1, wherein selectable control of the first end of a drawbar between a locked position and a suspended position is continuously maintainable.

9. The fluid circuit of claim 1, comprising a third control valve in fluid communication with the circuit, the third control valve configured to permit selective operator control of the suspended position the first end of the drawbar.

10. A work vehicle comprising:
a structure operatively connected to a fluid system to selectably control a position of a first end of a drawbar between a locked position and a suspended position with respect to a drawbar support, the drawbar secured to the vehicle distal from the first end, the fluid circuit comprising:
a first control valve comprising at least a raising position, a neutral position and a lowering position, with one of the positions of the first control valve being selectably in fluid communication with a first port and a second port, the first port of the first control valve connectable to a source of pressurized fluid flow, the second port of the first control valve connectable to a first accumulator;
a fluid cylinder in fluid communication with the second port of the first control valve to operate the fluid cylinder between a retracted position and an extended position, the fluid cylinder operatively connected to selectably control the position of the first end of the drawbar by operation of the fluid cylinder; and
a second control valve in fluid communication with the fluid cylinder comprising at least an open position and a locked position, with one of the positions of the second control valve being selectably in fluid communication with a third port and a fourth port, the third port of the second control valve connectable to the fluid cylinder, the fourth port of the second control valve connectable to a second accumulator;

wherein to selectably move the first end of the drawbar toward the locked position, the first control valve is selectably actuated to the lowering position and the second control valve is selectably actuated to the open position, until a support structure operatively connected to the fluid cylinder urges the first end of the drawbar into abutting contact with the drawbar support, and to maintain the first end of the drawbar in the locked position, the first control valve selectably actuated to the neutral position and the second control valve is selectably actuated to the locked position;

wherein to selectably move the end of the drawbar from the locked position to the suspended position, the first control valve is selectably actuated from the neutral position to the raising position and the second control valve is selectably actuated from the locked position to the open position.

11. The vehicle of claim 10, wherein to selectably move the first end of the drawbar toward the locked position, the lowering position of the first control valve is configured to provide fluid flow from the fluid cylinder in fluid communication with the first accumulator to a reservoir at a rate such that a magnitude of pressurized fluid in the first accumulator is decreased at substantially the same rate as the magnitude of pressurized fluid in the fluid cylinder.

12. The vehicle of claim 10, wherein the first control valve and the second control valve are solenoid valves.

13. The vehicle of claim 10, comprising a sensor for sensing a predetermined condition for selectably controlling the position of the first end of the drawbar.

14. The vehicle of claim 13, wherein the predetermined condition is selected from the group consisting of an engine load of the vehicle, a speed of the vehicle, a draft load on the drawbar, a setting of a control device configured to control the fluid circuit between a locked position and a suspended position of the first end of the drawbar with respect to the drawbar support, and a position sensor of an implement connected to the drawbar.

15. The vehicle of claim 14, wherein the implement is a scraper.

16. The vehicle of claim 10, comprising a relief valve in fluid communication with the first accumulator.

17. The vehicle of claim 10, wherein selectable control of the first end of a drawbar between a locked position and a suspended position is continuously maintainable.

18. The vehicle of claim 10, wherein distally securing the drawbar to the vehicle with respect to the vehicle results in a cantilevered arrangement of the first end when the first end is in the suspended position.

* * * * *